US006476383B1

(12) United States Patent
Esslinger et al.

(10) Patent No.: US 6,476,383 B1
(45) Date of Patent: Nov. 5, 2002

(54) DEVICE AND METHOD FOR GENERATING AND MANIPULATING COHERENT MATTER WAVES

(75) Inventors: Tilman Esslinger, Ingolstadt; Theodor W. Hänsch, München; Immanuel Bloch, Schlüchtern, all of (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 0 days.

(21) Appl. No.: 09/387,687

(22) Filed: Aug. 31, 1999

(51) Int. Cl.[7] .............................. H01S 1/00; H01S 3/00; H05H 3/02

(52) U.S. Cl. ........................................................ 250/251

(58) Field of Search .......................................... 250/251

(56) References Cited

U.S. PATENT DOCUMENTS

| | | | | |
|---|---|---|---|---|
| 3,761,721 A | * | 9/1973 | Altshuler et al. | 250/251 |
| 4,874,942 A | * | 10/1989 | Clauser | 250/251 |
| 4,886,964 A | * | 12/1989 | Pritchard et al. | 250/251 |

OTHER PUBLICATIONS

Habilitationsschrift der Fakultät für Physik der Ludwig-Maximilians–Universität München, Apr. 1999.

Bergeman, T. et al, "Magnetostatic trapping fields for neutral atoms", The American Physical Society 1987, v35, No. 4, pp. 1535–1546.

Lubkin, Gloria B., "Search and Discovery New Atom Lasers Eject Atoms or Run CW", Physics Today Apr. 1999, pp. 17–18.

Esslinger, Tilman et al, Bose–Einstein condensation in a quadrupole–Ioffe–configuration trap, Physical Review A Oct. 1998, v58, No. 4, ppR2664–R2667.

Bloch, Immanuel Bloch et al, "Atom Laser with a cw Output Coupler", Physical Review Letters, Apr. 12, 1999, v82, No. 15, pp. 3008–3011.

* cited by examiner

*Primary Examiner*—Bruce Anderson
(74) *Attorney, Agent, or Firm*—Schnader Harrison Segal & Lewis LLP

(57) ABSTRACT

A device for generating and manpulating coherent matter waves contains a magnetic trap being adapted to form a magnetic trapping potential for gas atoms, said magnetic trap comprising a plurality of trap coils being connected with a current supply device and including two quadrupole coils and one Ioffe coil, wherein the trap coils are arranged in such a relative position that a common trap is formed, said common trap having a quadrupole trap shape with one trap minimum if the quadrupole coils are in an operation condition and the Ioffe coil is in a currentless condition or two trap minima or a Ioffe trap shape if all the quadrupole and Ioffe coils are in an operation condition and a shielding device protecting the magnetic trap against external magnetic fields. A method of continuous extracting matter waves from the trap is described.

27 Claims, 7 Drawing Sheets

DEVICE AND METHOD FOR GENERATING AND MANIPULATING COHERENT MATTER WAVES

Figure 1:
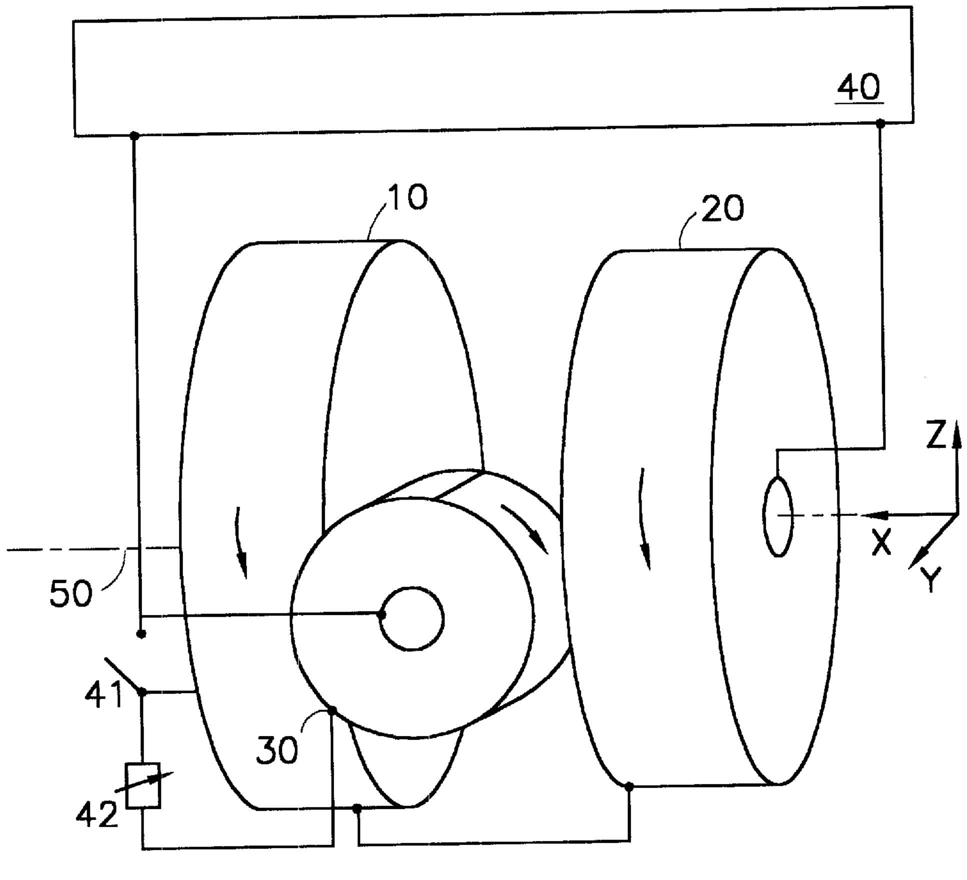

The present invention relates to devices for generating and manipulating coherent matter waves, in particular to an atom laser, as well as to a method of generating coherent matter waves in a pulsed or continuous mode.

The generation of coherent matter waves generally bases on the extracting or decoupling of atoms or atom groups from so-called Bose-Einstein-condensates (in the following: BEC's). In a BEC, a macroscopic number of bosonic atoms occupy the ground state of the system, which can be described by a single wave function. Although the existence of BEC's has been predicted by Albert Einstein and Satyendra Nath Bose even in 1924, the first experimental demonstrations of BEC's in alkali-metal gases have been obtained in 1995 only (see M. H. Anderson et al. in "Science", Vol. 269, 1995, p. 198; C. C. Bradley et al in "Phys. Rev. Lett.", Vol. 75, 1995, p. 1687, Vol. 78, 1997, p. 985; and K. B. Davis et al in "Phys. Rev. Lett.", Vol. 75, 1995, p. 3969). The BEC generation bases on the trapping of gas atoms in a magneto-optical trap (MOT) and a magnetic trap and cooling the trapped atoms to temperatures of less than one microkelvin.

The simplest way to magnetically trap atoms is to use the quadrupole field created by two coils with currents in opposite directions. In this configuration, the atoms can easily be loaded from a MOT (see C. Monoroe et al. in "Phys. Rev. Lett.", Vol. 65, 1990, p. 1571) into the magnetic trap since both traps have a common center and share the same symmetry. The magnetic trapping potential $\mu|B(r)|$ is given by the spatially varying magnetic field B(r) and the effective magnetic moment $\mu$ of the atom. For an atom in a weak-field-seeking state, the potential in a quadrupole trap grows linearly with distance from the trap center, where the magnetic field is zero. This zero field in the trap center represents the major disadvantage of quadrupole traps. The cold atoms can be removed from the trap center due to nonadiabatic spin flips (see e.g. W. Petrich et al. in "Phys. Rev. Lett.", Vol. 74, 1995, p. 3352). Due to this disadvantage, it is very difficult to achieve or manipulate a BEC in a quadrupole trap.

The above disadvantage of magnetic quadrupole traps has been solved with time-averaged orbiting potential (TOP) traps and with Ioffe traps (see the above publications of C. C. Bradley et al. and W. Petrich et al., and M.-O. Mewes et al. in "Phys. Rev. Lett.", Vol. 77, 1996, p. 416). The TOP trap bases on the superposition of a quadrupole field and a rotating magnetic field. With this technique, a low potential is obtained in the trap center, which avoids spin flips in the center of the trap. TOP traps are not convenient for manipulating BEC's in an effective way as only a small number of atoms can be trapped. Furthermore, the rotating magnetic field vector interferes with additional manipulating fields e.g. for the extraction of atoms from the BEC.

In a magnetic Ioffe trap, a two-dimensional quadrupole field is formed which extends in the third dimension as a cigar-shaped channel in which the atoms are trapped. Ioffe traps suffer from a difficulty in aligning the center of the magneto-optical traps for collecting and pre-cooling atoms with the center of the magnetic trap. Furthermore, Ioffe traps typically dissipate several kilowatts of power, which causes considerable cooling, stabilization and switching problems. The generation of coherent matter waves bases on the extraction of atoms from a BEC. The atoms which are in a magnetically trapped state are transferred into an untrapped state. The transition is induced by an external radio frequency (rf) field. A first output coupler for said extracted matter waves from a BEC has been described by M.-O. Mewes et al. in "Phys. Rev. Lett.", vol. 78, 1997, p. 582. In this experiment, the transition from the trapped to the untrapped state has been caused by a short rf pulse with a duration in the range of about one $\mu$s. This first matter wave generator or atom laser was restricted to a pulsed output, i.e. it was capable to generate only single coherent atom groups but not a continuous atom wave.

Additionally, the pulsed extraction has the following drawback. A fraction of the entire condensate is transferred quasi simultaneously from the trapped state into the untrapped state. In the untrapped state, the escaping atoms are accelerated by the gravitation potential, in which they occupy energy levels (eigenvalues) which are distributed over a certain energy band. This energy band is relatively broad as the coupling rate from the trapped state to the untrapped state is high. Due to the broad energy band, the extracted atoms have a broad velocity distribution reducing the stability and collimation of the extracted matter wave.

Finally, the conventional magnetic traps are characterized by field fluctuations so that they are not capable to a allow a stable outcoupling of atoms from the trap in a precise and reproducible manner.

The object of the invention is to provide an improved magnetic trap with an increased stability of the trap potential and an improved generator of continuous or quasicontinuous coherent matter waves, which particularly are characterized by a narrow energy band width and high beam collimation. A further object of the invention is to provide a device for manipulating coherent matter waves. Yet another object of the invention is to provide a method of generating coherent matter waves.

Generally, a matter wave generator is described which comprises an atom laser device for the creation of coherent matter waves by extracting atoms from a magnetic trap and a magnetic field shielding device surrounding the magnetic trap. Furthermore, a matter wave manipulator is described which comprises at least one magnetic trap, which is shielded against external magnetic fields with a magnetic field shielding device surrounding the magnetic trap. The magnetic field shielding device is preferably a housing made of a magnetic shielding material (material with a high magnetic permeability).

According to a first aspect of the invention, a new magnetic trap configuration for an atom laser is described which incorporates both a quadrupole and a Ioffe configuration (in the following: QUIC trap), wherein the magnetic trap is provided with the shielding device protecting the trap against external magnetic fields. As the shielding device, generally an active shielding technique can be used as it is known as such from electron microscopes. Active shielding techniques are based on the measurement of external magnetic fields with magnet sensors and controlling compensation coils in dependence on the sensor signals. Preferably, the housing made of magnetic shielding material is used as the shielding device. The QUIC trap comprises a plurality of trap coils which are capable of forming a common trap with a variable trap shape. The trap shape can be changed from a quadrupole shape which facilitates the atom supply to the QUIC trap, to a Ioffe shape allowing a stable formation of a BEC from the supplied atoms. According to their function, two of the trap coils are called quadrupole coils which form the quadrupole trap as it is known from conventional quadrupole traps as such. A third trap coil is called a Ioffe coil as this third coil has the function to form, in co-operation with the quadrupole coils, the Ioffe trap shape. During the formation of the Ioffe shape, the trap center moves from the center of the quadrupole coils towards the Ioffe coil so that the trapped atoms are shifted within the coil arrangement.

Preferably, the quadrupole coils are identical coils being arranged along a common reference line with a quadrupole coil space therebetween. The third coil, the Ioffe coil, has a smaller dimension than the quadrupole coils and is positioned at least partially in the quadrupole coil space.

According to a further preferred embodiment of the invention, the trap coils are mounted on copper tubes which are connected with a cooling system and which are provided with means for avoiding eddy currents. As an additional measure against the generation of eddy currents, shielding plates are provided between the trap coils and the supporting copper tubes. Preferably, these shielding plates are made from the same material like the above shielding housing.

According to a second aspect of the invention, a matter wave generator or atom laser is described which comprises two magnetic traps a first of which is a magneto-optical trap for trapping and precooling gas atoms and the second of which is being capable of forming magnetic trap with the above new configuration. The second magnetic trap can be operated in two different modes. In the first (magneto-optical) mode, a cold gas is prepared by laser cooling. In the second (magnetic) mode, atoms are further cooled by evaporative cooling to form a BEC and finally extracted from the BEC. To this end, the matter wave generator is further provided with a cooling and outcoupling coil which has a double function. Firstly, the cooling and outcoupling coil is used for the evaporative cooling of the gas to reach the BEC state. Secondly, this coil induces transitions from trapped to untrapped atom states.

According to a preferred embodiment of the matter wave generator, the second magnetic trap is provided with a shielding device protecting the magnetic trap against external magnetic fields.

According to a third aspect of the invention, a matter wave manipulator is described which comprises at least one magnetic trap (magnetic manipulator trap) capable of forming a potential for subjecting a matter wave to a change of the traveling direction thereof. Furthermore, the matter wave manipulator contains a switching device adapted to induce transitions from a non-magnetic state to a magnetic state and vice versa in the atoms of the matter wave. The nonmagnetic state corresponds to the above untrapped state, in which the atoms have practically no interactions with the magnetic potential of the magnetic trap. In the magnetic state corresponding to the above trapped state, the atoms interact with the magnetic potential. The switching device comprises a laser source in a first embodiment. Alternatively, it is implemented with a rf emitter like the above cooling and outcoupling coil.

According to a preferred embodiment of the matter wave manipulator, at least the magnetic trap is provided with a shielding device protecting it against external magnetic fields. This shielding device can be the same shielding as the magnetic trap of-the atom laser described above.

The matter wave manipulator can have a wave directing element or a beam forming element, like a mirror or a lens. The function of the matter wave manipulator is selected via the definition of a predetermined potential in the magnetic manipulator trap.

According to a fourth aspect of the invention, a method of generating coherent matter waves using a magnetic trap with the above new configuration is described. Essential steps of this method are the transfer of cooled atoms from a quadrupole trap to a Ioffe trap with the above QUIC trap as well as the extraction of atoms from the Ioffe trap using a cooling and outcoupling coil.

Compared with the conventional trap configurations and attempts to generate matter waves, the invention has the following essential advantages. By spatially separating the centers of the quadrupole and the Ioffe geometry in the QUIC trap, a magnetic trap of unexpected simplicity and efficiency is created. The QUIC trap consists in a preferred embodiment of merely three coils and dissipates no more than 600 W while operating at a current of only 25 A. The QUIC trap provides an extremely stable trapping potential allowing for the first time a continuous wave output coupling as the magnetic field fluctuations experienced by the trapped atoms are minimized. The level of fluctuations in the magnetic field is much less than the change of the magnetic field over the spatial sizes of the BEC. The compactness of the QUIC trap allows it to be placed inside a magnetic shielding housing which reduces the magnetic field of the environment and its fluctuations by a factor of approximately 100.

Further advantages are related to the operation of a matter wave generator and/or manipulator with the new magnetic trap. For the first time, a brightness can be reached which is up to ten orders of magnitude higher than the brightness of atom groups generated by conventional atomic beam sources.

Figure 2:
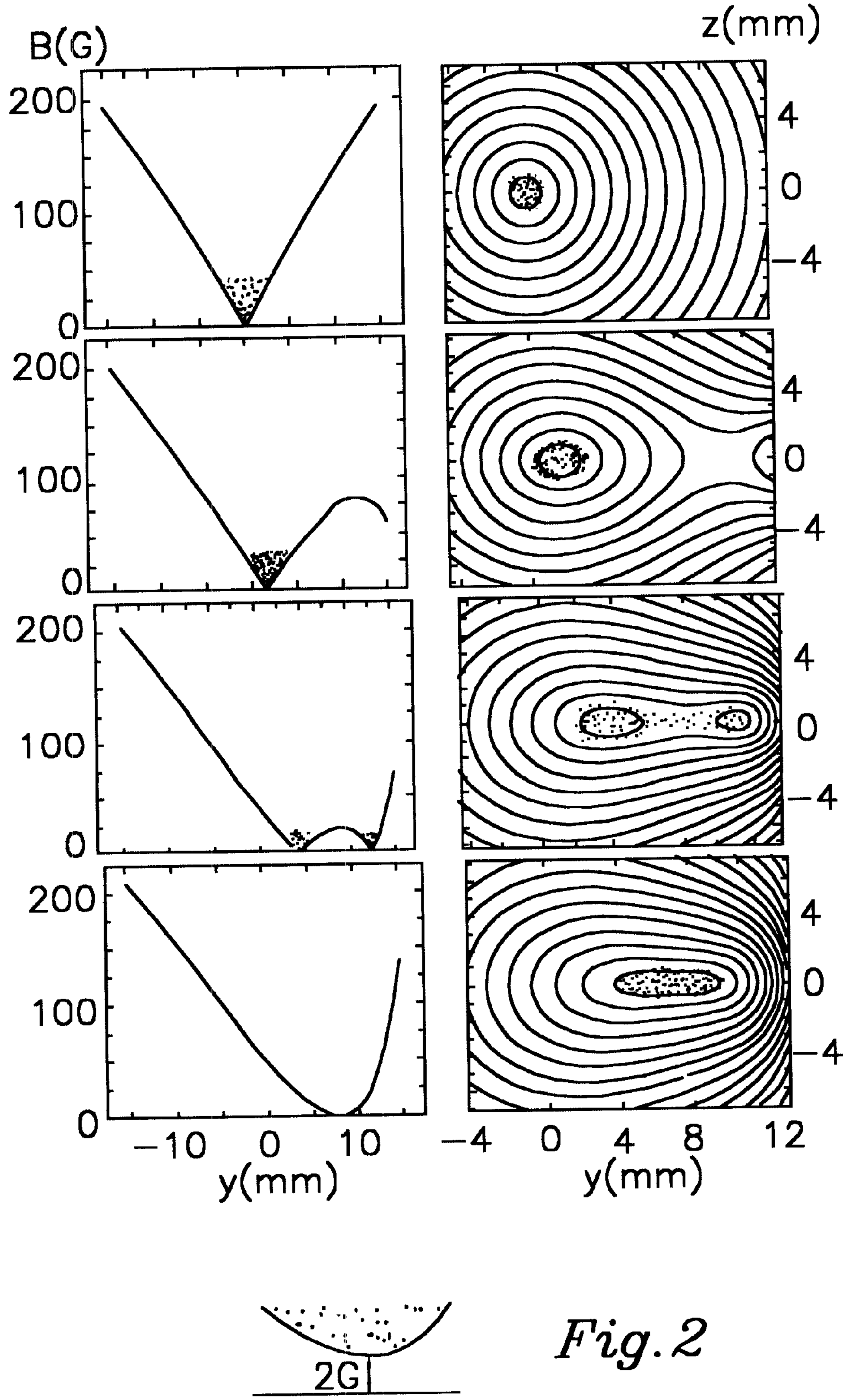
Figure 3:
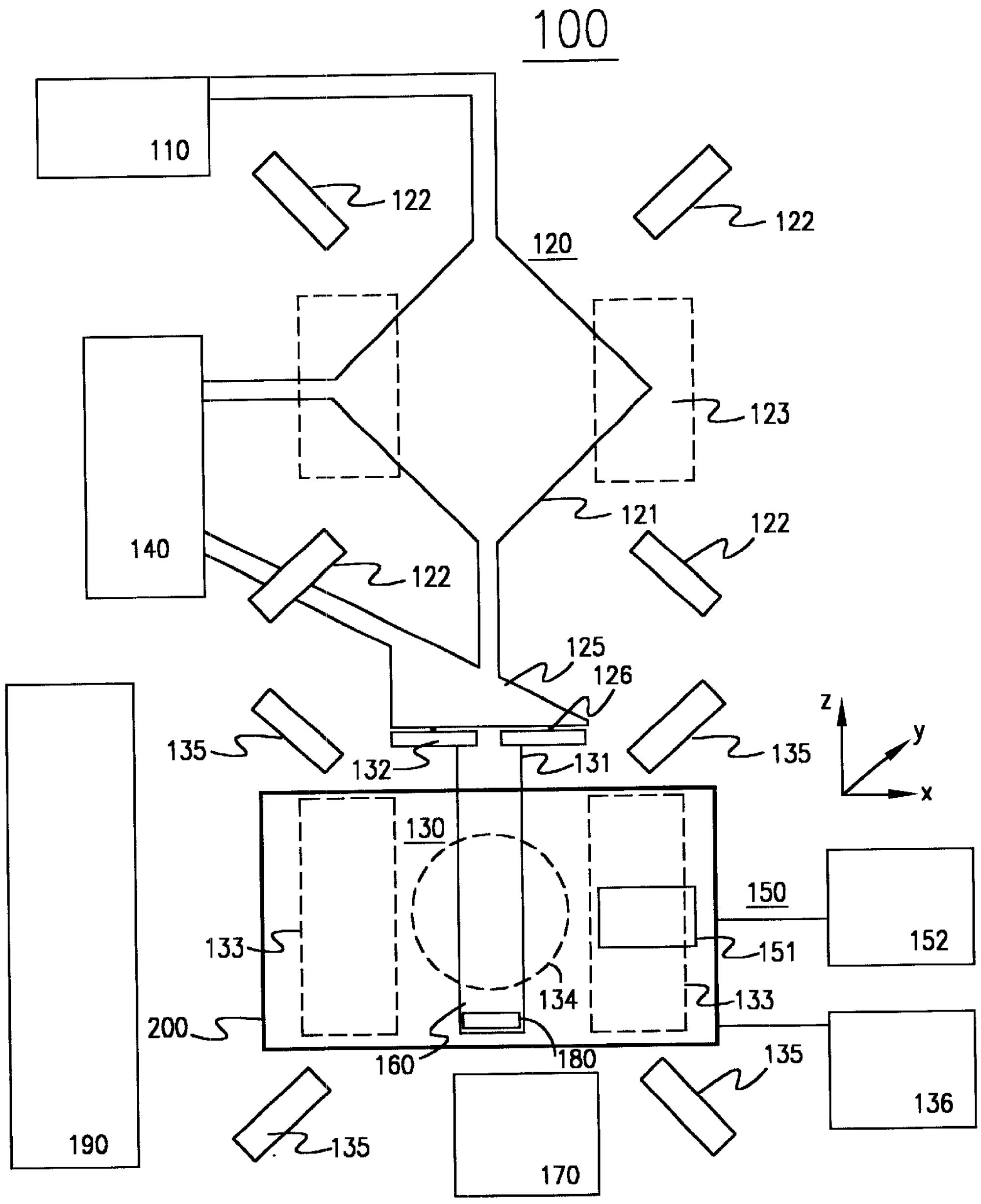
Figure 4:
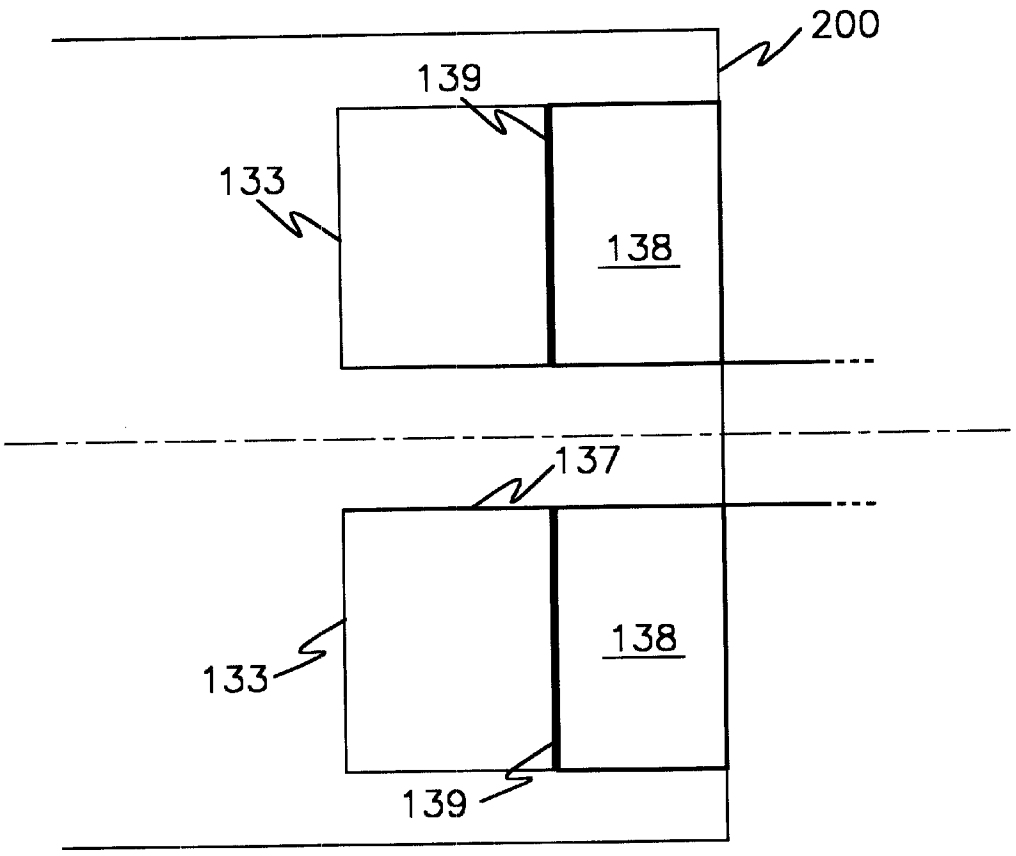
Figure 5:
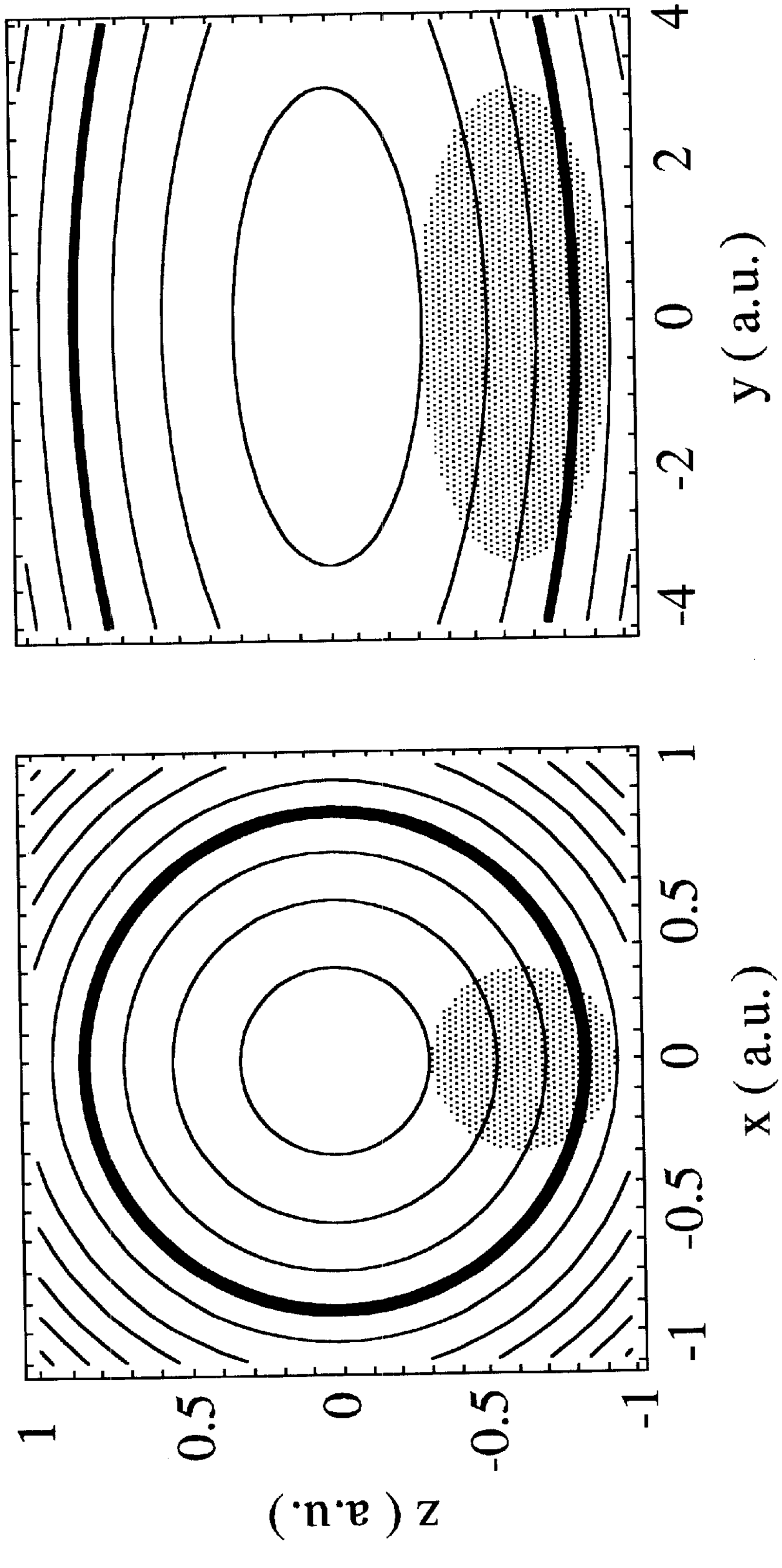
Figure 6:
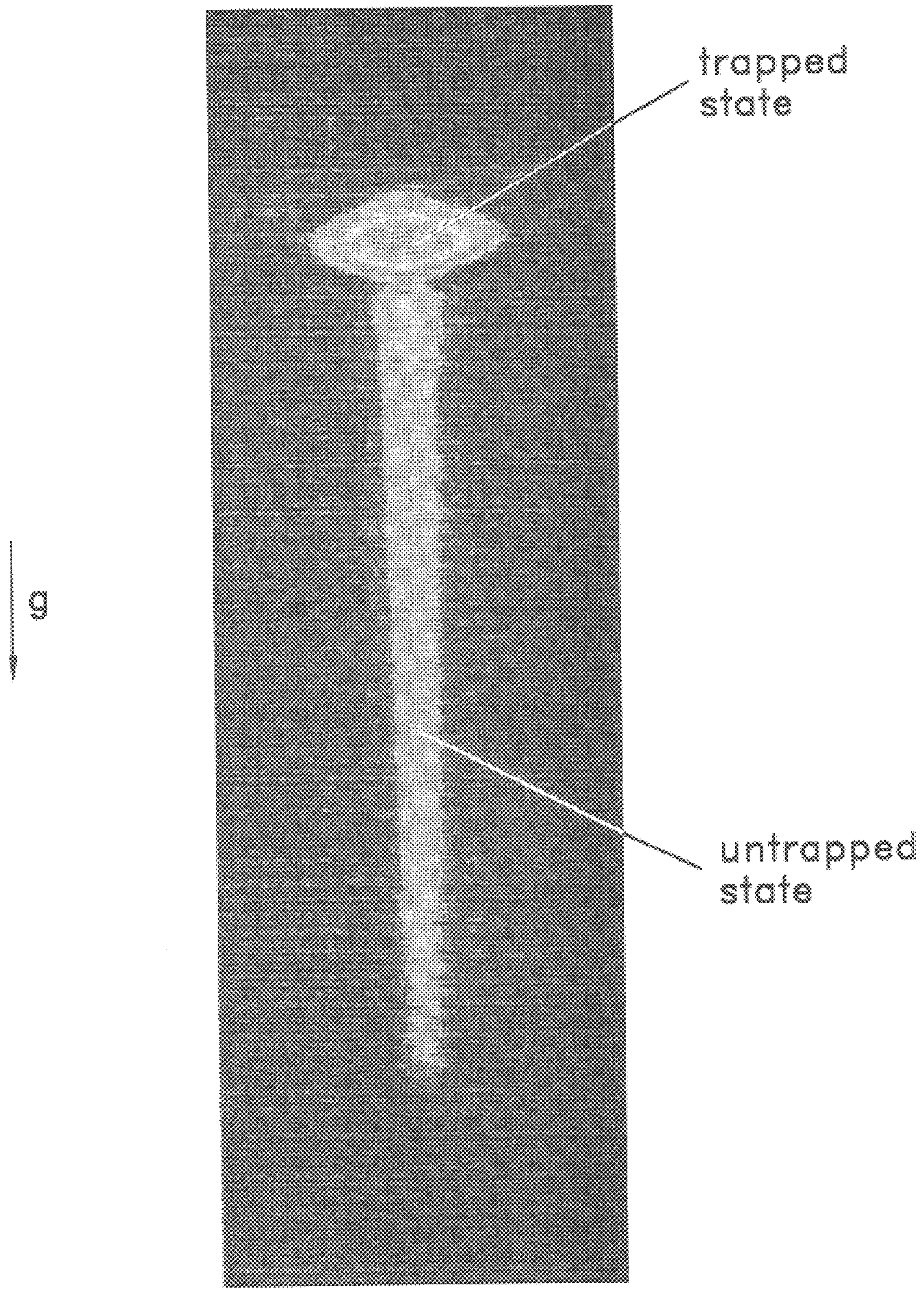
Figure 7:
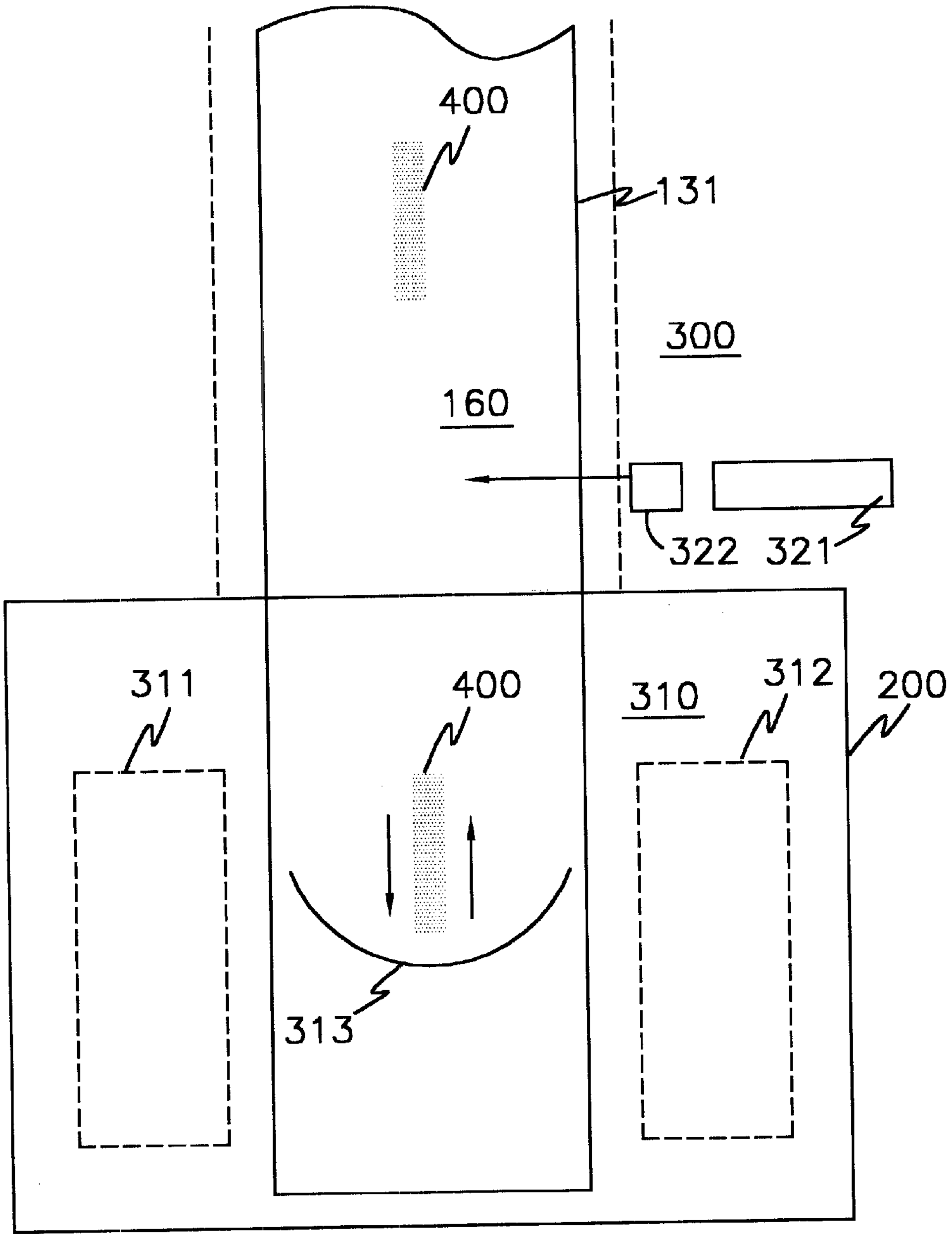

Further details, advantages and applications of the invention are described in the following with reference to the attached drawings. The drawings show:

FIG. 1 a schematic sectional view of the QUIC trap according to the invention, FIG. 2 an illustration of the magnetic field in a QUIC trap with various operation conditions, FIG. 3 a schematic view of a matter wave generator according to the invention, FIG. 4 a schematic illustration of the trap coil arrangement in a QUIC trap, FIG. 5 an illustration of the BEC position in a QUIC trap, FIG. 6 a schematic illustration of an atom laser output beam generated with a method according to the invention, and FIG. 7 an illustration of the manipulation of a matter wave according to the invention.

The preferred embodiment of the QUIC trap is shown in FIG. 1. It consists of two identical quadrupole coils 10, 20 and one Ioffe coil 30. The coils are serially connected with a schematically shown current supply 40 which creates in the quadrupole coils 10, 20 equal current $I_q$ in opposite directions (see arrows).The electrical current $I_{Ioffe}$ created in the Ioffe coil 30 depends on the state of switch 41. With a closed switch 41, practically the whole current $I_q$ flows via the switch 41 and the Ioffe coil 30 is in a currentless condition or unoperated condition. With an opened switch 41, the whole current $I_q$ flows via the Ioffe coil 30 which is in an operated condition. The resistor 42 is adapted to vary the current $I_{Ioffe}$ to a maximum current (e.g. 25 A). The current through the quadrupole and Ioffe coil 10, 20, 30 is controlled to have a fixed value of e.g. 25 A.

The trap coils 10, 20, 30 are cylindrical coils. The cylinder axes of the quadrupole coils 10, 20 are oriented along a common reference line 50 parallel to the x-direction of the illustrated Cartesian coordinate system. The cylinder axis of the Ioffe coil 30 is oriented perpendicular to the x-direction, thereby crossing the reference line 50. The Ioffe coil 30 protrudes into the quadrupole coil space between the quadrupole coils 10, 20.

The trap coils have the following dimensions. The identical quadrupole coils 10, 20 each have about 180 windings forming the cylinder shape with a 34 mm inner diameter, 68 mm outer diameter and 30 mm length. The Ioffe coil 30 has 150 windings. The Ioffe coil 30 is cylindrically or slightly conically shaped with a 6 mm inner diameter, 30 mm outer diameter and a 34 mm length. The coils are made from a copper wire (diameter 1.5 mm). The quadrupole coils are arranged with a distance therebetween forming a quadrupole coil space. With a center to center distance between the quadrupole coils of about 66 mm, the quadrupole coil space has a dimension of about 36 mm. The Ioffe coil 30 at least partially protrudes into the quadrupole coil space. Preferably, the distance between the center of the Ioffe coil 30 and the symmetry axis (reference line 50) of the quadrupole coils 10, 20 is about 34 mm. The resistor 42 has a resistance of about 1 Ω.

The trap coils form a common magnetic trap, the shape of which depends on the current through the Ioffe coil 30. The trap shape variation with increasing Ioffe current $I_{Ioffe}$ is described in the following under reference to FIG. 2. A current $I_q$ through the quadrupole coils 10, 20 produces a spherical quadrupole trap in the center of the two coils. This trap is converted into the Ioffe configuration by turning on the current $I_{Ioffee}$ through the Ioffe coil 30. In the left column of FIG. 2, the absolute value of the magnetic field along the axis of the Ioffe coil (y-axis) is plotted for different currents $I_{Ioffe}$ and a fixed current $I_q$=25 A. With other words, FIG. 2 illustrate the trap shape if monitored in x-direction through the quadrupole coils 10, 20. In the right column of FIG. 2, the values of the magnetic fields in the y-z-plane are shown. In the first row (a), the Ioffe current is zero (the Ioffe coil is in a current-less condition). For the remaining rows, the Ioffe coil is in an operation condition with Ioffe currents of 10 A (b), 20 A (c) and 25 A (d). Each contour in the right column of FIG. 2 corresponds to an increase of 15 G in the magnetic fields.

With increasing current $I_{Ioffee}$, the magnetic zero of the quadrupole trap is shifted (see row (b)) towards the Ioffe coil 30 and a second zero appears in the magnetic field (see row (c)), resulting in a second quadrupole trap minimum in the vicinity of the Ioffe coil 30. The two spherical traps form a common trap, wherein the sub-traps have perpendiculary oriented axes. When the current $I_{Ioffee}$ approaches 25 A, the two spherical traps merge, and a Ioffe trap is formed with the characteristic ellipsoid or "cigar" geometry of the trap potential.

The magnetic field of the Ioffe coil 30 increases the magnetic field gradient produced by the quadrupole coils 10, 20 along the z-direction and decreases the field gradient along the symmetry axis (x-direction) of the quadrupole coils 10, 20.

The confinement of atoms loaded into the QUIC trap (see below) along the long axis (y-direction) of the Ioffe trap is given by the field curvature produced by the Ioffe coil 30, which scales as $I_{Ioffe}/R^3$, with R being the radius of the coil 30. Since the minimum of the trapping potential is close to the Ioffe coil 30, a small radius R can be chosen (e.g. 10 mm) so that the atoms are tightly confined even for a low current $I_{Ioffe}$. At the minimum of the trapping potential the field of the Ioffe coil 30 and the field of the quadrupole coils 10, 20 almost cancel each other so that advantageously additional bias coils to compress the Ioffe trap in the radial direction are not necessary. This simplifies the construction of the whole trap and facilitates the provision of a complete trap housing as described below.

In the Ioffe configuration, the trap has a radial gradient of 220 G/cm and the axial curvature is 260 G/cm$^2$, with a current of 25 A running through all three coils. The offset field of 2 G results in trapping frequencies of 2π·200 Hz in the radial and 2π·20 Hz in the axial direction, for rubidium atoms in the $|F=2, m_F=2)$ state.

During the conversion process illustrated in FIG. 2, a trapped atomic cloud will follow the initial shifting and deformation of the trapping potential in a reversible manner, as long as the process is carried out slowly to be adiabatic. Before the Ioffe configuration is reached, the second quadrupole trap appears in the vicinity of the Ioffe coil 30 (see FIG. 2*c*). The potential takes on the form of a double well. As the trapped atoms start to spill over into the second minimum of the common trap, the system can no longer be kept in equilibrium. At this point the conversion becomes an irreversible process. When the two quadrupole traps have been merged, the barrier between the two potential minima disappears and the atoms experience the harmonic potential of the Ioffe trap (see FIG. 2*d*). This behavior of the atomic cloud can be visualized by absorption images of the trapped atoms. The real behavior of the atoms under the influence of gravity in an atom laser according to the invention will be described below under reference to FIG. 5.

The QUIC trap according to the present invention has the following particular advantages. Firstly, the QUIC trap does not require additional offset coils as the offset potential is created by the quadrupole coils. This elimination of the offset coils reduces the dimensions and complexity of the whole trap construction. The 2 G offset potential illustrated in the lower part of FIG. 2 ensures that the potential at the trap minimum is not vanishing. Furthermore, the confinement in the Ioffe trap is extremely high compared with conventional traps having a comparable power consumption. The power consumption of the QUIC trap is more than one order of magnitude smaller than the consumption of conventional traps.

The most important application of the QUIC trap is the use as a magnetic trap for creating a Bose-Einstein condensate in an atom laser according to the invention. This atom laser will be described in the following under reference to FIG. 3 which shows a schematic view of the practical set-up of an embodiment of the atom laser. The invention is not restricted to this arrangement but rather implementable with modified numbers and arrangements of e.g. magneto-optical traps.

The atom laser or matter wave generator 100 illustrated in FIG. 3 comprises a gas atom supply device 110, a first magneto-optical trap 120, a second magneto-optical or magnetic trap 130 which is formed by the QUIC configuration of the invention, a pumping system 140, a cooling and outcoupling device 150, an output channel 160, a measurement system 170 and a target 180. The reference numeral 190 generally indicates a monitoring and controlling system.

The atom laser 100 of the invention comprises the illustrated combination of the two magneto-optical traps 120, 130 mounted on top of each other with the trap centers being spaced from each other. The upper system (trap 120) is a standard vapor cell trap that is pumped by an ion pump (2 l·s$^{-1}$) which is contained in the pumping system 140. The vapor cell 121 is surrounded by six laser beam sources 122 which are single lasers with the same wavelength or reflectors directing light from at least one common laser device to the center of the trap 120. In the drawing, only four lasers are shown for clarity reasons. The laser beam geometry is adapted to form three pairs of mutually counter propagating beams one beam axis is oriented along the horizontal y direction and the other two beam axes are oriented along the diagonals in the x-z plane (plane of the drawing). All laser beams are preferably derived from grating stabilized diode lasers 122. For the trap 120, the laser beams are apertured to a diameter of 12 mm.

The vapor cell 121 between the quadrupole coils 123 is a metal cell with typical dimensions of 10 cm·10 cm·4 cm. The vapor cell 121 is connected via a tube 124 and a connection piece 125 with the ultra-high-vacuum glass cell 131 of the second trap 130. The tube 124 has a length of about 5 cm and an inner diameter of 5 mm. The connector piece 125 provides a connection with the pumping system 140 further containing a turbomolecular and a titanium sublimation pump. The pumping system 140 is adapted to provide a pressure of about $2 \cdot 10^{-11}$ mbar in the glass cell 131 which is extremely lower compared with the pressure in the cell 121. The glass cell 131 is made of 5-mm-thick optical quality glass and its outer dimensions are 3 cm·3 cm·12 cm, with the long dimension oriented vertically (z-direction). The connection between the metallic tube 124 and connector piece 125 with the glass cell 131 represents an important aspect of the present invention. In order to provide a pressure tight metal-glass connection, the glass cell 131 has a glass plate 132 at its upper end. This glass plate 132 is pressed against the lower face of the connecting piece 125 with a vacuum sealing 126 therebetween. This metal-glass connection between two plane plates has the following important advantage. Two materials with different heat expansion parameters are directly connected vacuum tightly in a simple manner. Conventional connections with step-wise changing glass types are avoided. Accordingly, the atom laser 100 can be made very compact without a draw-back for the required ultra-high vacuum.

The second trap 130 is formed by a QUIC configuration as described above. The reference line of the quadrupole coil 133 is oriented parallel to the x-direction. The axis of the Ioffe coil 134 is perpendicular to the drawing plane. For clarity reasons, the coils of the QUIC trap are shown with broken lines. The reference numeral 135 indicates a laser-beam geometry which is identical as in the case of the upper trap 120. The laser beams are apertured to a diameter of 14 mm. Due to the conical shape of the Ioffe coil 134, the diagonal laser beams are not obstructed.

The cooling and outcoupling device 150 comprises a cooling and outcoupling coil 151 and a radio frequency generator 152. The coil 151 is used both for evaporative cooling and extracting of atoms from the BEC in the QUIC trap 130 (see below). The coil has 10 windings and a diameter of 25 mm, and is mounted 30 mm away from the trap center inside of one of the quadrupole coil 133. The magnetic field vector of the radio frequency field is oriented in the horizontal plane, perpendicular to the magnetic offset field of the trap. The radio frequency generator 152 is a frequency synthesizer (HP 33120A).

The reference numeral 136 indicates a current supply for the coils 133, 134 of the QUIC trap 130. The current supply 136 is extremely stabilized. The relative current variations $\Delta I/I$ are smaller than $10^{-4}$. The construction of the QUIC trap 130 in combination with this single current supply 135 represents a particular advantage of the invention. The QUIC trap 130 is operated with only one highly stabilized current supply. With one single current control, the characteristics of the QUIC trap (confinement of the trap, relative position of the trap potential compared with the RF field of the coil 151) are defined. The residual fluctuations in the magnetic field are reduced to a level below 0.1 mG.

The components of the QUIC trap 130 are built into a shielding device 200 which comprises in a preferred embodiment of the invention a metallic box made of a material magnetic shielding material (material with a high permeability). The box is provided with openings for the cell 131 and the laser beams. Preferably, the shielding device is made of an alloy with a relative magnetic permeability higher than 15000. An example for such an alloy is so-called $\mu$-metal (or mu-metal) or permalloy which is a Ni alloy with a relative permeability of about 50000. The $\mu$-metal box 200 shields the QUIC trap 130 from the earth's magnetic field and reduces environmental magnetic noise. The thickness of the $\mu$-metal walls of the box 200 is about 0.5 mm. The $\mu$-metal box 200 has typical dimensions in the range of about 15 cm·15 cm·15 cm. The coils of the QUIC trap are put on copper tubes (see FIG. 4). Each of these tubes is connected to a copper mount that can be cooled with low pressure tap water. The tubes and the mounts are slitted to avoid eddy currents when switching the trapping field on or off.

The measurement and monitoring system 170 and the target 180 represent schematically components which are implemented in dependence on the application of the atom laser 100. As far as the atom laser 100 is adapted to investigate the extracted atoms, only the measurement and monitoring system 170 is provided. The system 170 comprises e.g. an optical measurement device for investigating matter waves travelling along the output channel 160.

The reference numeral 110 indicates the gas atom supply device as it is known as such from conventional trapping experiments. The connection between the supply device 110 and the vapor cell 121 is provided with control means (not shown).

FIG. 4 illustrates the arrangement of the trap coil in the QUIC trap 130 as a sectional view. At least one or preferably all trap coils (133, 134, see FIG. 3) are mounted on copper tubes 137 with a step-shaped cross-section which are connected with a cooling system 138. In the copper tube 137, slits for avoiding eddy currents are formed. As an additional measure against the generation of eddy currents, a shielding plate 139 is provided between the trap coil 133 and the supporting copper tube 137. The shielding plate has a thickness of about 0.5 mm and a circular shape adapted to the shape of the tube 137. Preferably, the shielding plate is made of an alloy with a relative magnetic permeability higher than 15000. An example for such an alloy is the above $\mu$-metal or permalloy. The reference numeral 200 indicates the above shielding housing. The provision of the shielding plate represents an essential advantage of the invention as it allows fast current switching operations on a time scale in the range of 10 to 50 ms or even down to 1 ms. This fast switching is important for the trap conversion from a MOT to a magnetic trap described below as weel as for monitoring a BEC after non-adiabatic switching off the magnetic trap.

For generating a coherent matter wave with the atom laser 100 according to FIG. 3, as a first step, gas atoms are loaded from the gas atom supply device 110 to the magneto-optical trap 120. As an example, the gas of rubidium atoms is used. Typically, $10^8$ rubidium atoms are trapped and cooled in the trap 120. The steps of trapping and Doppler effect laser cooling the atoms using the quadrupole coils 123 and the semiconductor lasers 122, respectively, are known as such from conventional quadrupole traps. Therefore, these steps are not described with further details.

Subsequently, the atoms are transferred into the QUIC trap 130 where they are further cooled by rf-induced evaporation. The transfer from the upper magneto-optical trap 120 to the lower trap 130 is obtained by the use of optical forces. The semiconductor lasers 122 are detuned so that the atoms are pushed through the tube 124 to the glass cell 131. In this situation, the quadrupole coils 133 and the semiconductor lasers 135 of the lower trap 130 are operated as a magneto-optical trap for trapping the atoms transferred from the upper trap 120.

Preferably, the step of transferring atoms into the QUIC trap 130 is repeated. The lower trap 130 is multiply loaded with atoms from the upper trap 120 until about $10^9$ atoms are contained in the lower trap 130. This corresponds to about 50 to 100 loading steps.

As the next step, the lower trap 130 is converted from the magneto-optical operation to a magnetical operation in order to prepare the trapped atoms for the formation of the BEC. The semiconductor laser 135 are switched off and the trapped atoms are compressed by increasing the magnetic-field gradient (see W. Petrich et al in "J. Opt. Soc. Am. B", Vol. 11, 1994, p. 1332). Simultaneously, the frequency of the trapping beams is detuned by several linewidths. This is followed by 3 ms of polarization gradient cooling to about 40 $\mu$K, with the quadrupole field switched off. Then a 1 G bias field is applied for 1 ms and the atoms are optically pumped into the low field-seeking $|F=2, m_F=2)$ spin state. Subsequently the magnetic quadrupole field is switched on to an axial gradient of 70 G/cm within 1 ms and the magnetically oriented atoms are trapped. The 1 G bias field is turned off 1 ms later. Then the axial field gradient is increased to 150 G/cm within 2 s, before the current through the Ioffe coil 134 is switched on and the trap is converted to a Ioffe trap configuration as outlined above.

In this situation, the atom cloud in the lower trap 130 has not yet reached the Bose-Einstein state. The phase transition to a BEC requires a further temperature reduction and an increased density of the atoms. These conditions are only obtained in the Ioffe trap configuration under the influence of an evaporative cooling.

The evaporative cooling of the atoms is performed by rf-induced spin flips. The atoms are subjected to the radiofrequency emitted by the cooling and outcoupling coil 151. The rf-fields induce spin transitions (spin flips) from a trapped to an untrapped state for atoms being located at the highest occupied energies in the trapping potential. With other words, the trap is opened at its high energy side so that atoms with high energy (hot atoms) are extracted leaving the atoms with lower energies in the trap. The remaining cold atoms are colliding with each other so that some of the atoms again have an increased energy allowing them to leave the trap via the spin flips. The cooling efficiency depends on the collision rate of the trapped atoms. It is an important advantage of the Ioffe trap formed in the lower trap 130 according to the principles outlined above (see FIG. 1) that the trap is characterized by a high confinement and steep potential walls.

The evaporative cooling is performed under the following conditions. Over a period of 23 s the rf-frequency is swept from 30 MHz to a final value of around 1.4 MHz. At the end of the evaporative cooling, the atoms have a temperature of about 100 nK, and the BEC is formed. In this situation the QUIC trap is operated with trapping frequencies of $\omega_{195} = 2\pi \cdot 180$ Hz in the radial and $\omega_x = 2\pi \cdot 19$ Hz in the axial direction. The trap has a magnetic field of 2.5 G at its minimum.

After the creation of the BEC, the step of extracting a matter wave from the trapped atoms is performed. The extraction step bases on the following principle. The matter wave to be generated with the atom laser 100 is formed by a continuous extraction of atoms from the trapped BEC. This continuous extraction is obtained like in the case of the evaporative cooling by inducing predetermined spin flips with the cooling and outcoupling coil 151. With a continuous inducing of spin transitions by radio frequency excitation, the atoms feel a partial opening of the trap. This opening is performed even at a spatial position where the resonance condition for the respective spin flip is fulfilled.

According to a first embodiment of the invention, the radio frequency value is continuously swept. By a continuous change of the radio frequency value emitted by coil 151, the outcoupling position (where the resonance condition is fulfilled) can be scanned through the trapping potential. This allows a continuous extraction of an atom wave starting from the upper side of the trap potential until all atoms have been extracted. According to a second embodiment of the invention, the radio frequency value is kept constant with a value fulfilling the resonance condition of the atoms at the minimum of the magnetic trap. This allows a continuous extraction of an atom wave from the potential minimum.

The continues extraction of atoms is conducted at a predetermined position of the potential which due to the extreme potential stability comprises only an extremely restricted region (typical dimension in the pm range). All the atoms which are extracted from the condensate experience the same gravitational potential resulting in a monoenergetic output. This situation corresponds to a reduced and weak coupling rate during the extraction process compared with conventional atom lasers with pulsed output. Accordingly, the energy states occupied by the escaping atoms cover a narrower energy band and the atoms have a narrower velocity distribution. This represents an essential and important advantage of the invention compared with the conventional techniques.

Practically, after the creation of the BEC, the rf-field used for evaporative cooling is switched off, and 50 ms later the radio frequency of the same cooling and outcoupling coil 151 is switched on for a time of 15 ms as an example. The field of the coil 151 is increased up to an amplitude of $B_{rf}=2.6$ mG within 0.1 ms. Subsequently, the frequency follows a linear ramp from 1.752 to 1.750 MHz to shift the outcoupling position through the trap according to the shrinking size of the condensate according to the above first embodiment. Over the period of the radiofrequency shift, atoms are extracted from the condensate and accelerated by gravity (negative z-direction in FIG. 3).

In the following, the outcoupling mechanism is described in more detail with reference to FIG. 5. The magnetic field B(r) gives rise to a harmonic trapping potential which confines the condensate in the shape of a cigar, with its long axis oriented perpendicular to the gravitational force. The rf field of frequency $\nu_{rf}$ induces transitions from the magnetically trapped $|F=2, m_F=2>$ state to the untrapped $|F=2, m_F=0>$ state via the $|F=2, m_F=1>$ state. Here F denotes the total angular momentum and $m_F$ is the magnetic quantum number. The resonance condition $1/2\ \mu_{B|B(r)|=h\nu rf}$, where $\mu_B$ is the Bohr magneton and h is the Planck constant, is satisfied on the surface of an ellipsoid which is centered at the minimum in the magnetic trapping field. Without gravity the condensate would have the same center, so that an undirected output could be expected. The frequency range in which significant output coupling occurs would then be determined by the magnetic field minimum $B_{off}$ and by the chemical potential of the condensate:

$$1/2\ \mu B_{off} \leqq 1/2(\mu_B B_{off} + \mu).$$

Because of gravity, the minimum of the trapping potential is displaced relative to the minimum of the magnetic field. With g being the gravitational acceleration, this displacement is given by $g/\omega_\perp^2$, which is 7.67 $\mu$m for the present trapping parameters. The confinement of the trap and hence the spatial size of the condensate remain the same. In this geometry, which is illustrated in FIG. 5, output coupling occurs only at the intersection of the displaced condensate with the ellipsoid that is determined by the resonance condition. Atoms leaving the condensate therefore experience a directed force which is dominated by gravity and gives rise to a collimated output beam. The frequency range over which output coupling can be achieved is larger than without gravity, because the condensate is shifted into a region of an increasingly stronger magnetic field gradient. The frequency interval $\Delta\nu = g\sqrt{2\,\mu m/h\omega_{195}}$), where m is the atomic mass, gives the difference in frequency between an rf field that is resonant with the upper edge and an rf field that is resonant with the lower edge of the condensate, assuming a Thomas-Fermi distribution. For the above trapping parameters and $7\times10^5$ rubidium atoms in the condensate this frequency interval is $\Delta\nu$=10.2 kHz.

In FIG. 5, the thick line indicates the region where the rf field transfers atoms from the magnetically trapped state into an untrapped state. Because of gravity, the condensate is trapped 7.67 $\mu$m below the minimum in the magnetic field. In the untrapped state the atoms experience the direct gravity force and the mean field of the condensate. This results in the collimated output beam. The atom laser output beam is illustrated as an example in FIG. 6. The illustrated beam being derived from the BEC over a 15 ms period of continuous output coupling contains $2\cdot10^5$ atoms and its divergence in the plane of absorption is below the experimental resolution limit of 3.5 mrad. If the magnetic field amplitude $B_{rf}$ of the rf field is reduced, the output beam can be obtained over a longer period of time. The output coupling process can be extended over up to 100 ms with $B_{rf}$=0.2 mG. A further extension is possible if an increased number of atoms is loaded into the trap or a reduced output rate is used or a mechanism of continuous refilling the lower trap is implemented. It is emphasized that a radiation time of 100 ms represents a continuous matter wave generator operation in consideration of the time scale of typical processes in the BEC manipulation. On the other hand, also pulsed operation is possible with the atom laser 100.

In the upper part of FIG. 6, a fraction of condensed atoms in the magnetically trapped state is shown. Beneath the condensed atoms, the matter wave beam with atoms in the $m_F$=0 state is shown. It is important note that the atoms in the vertically extending beam ($m_F$=0) are still part of the common condensate which has been initially formed in the trap. The vertical length of FIG. 6 is about 2 mm.

The extracted matter wave beam is travelling along the output channel 160 (see FIG. 3). Depending on the application, a matter wave manipulator with a beam forming element or a matter wave directing element can be positioned in the channel 160. The beam forming elements comprise e.g. "magnetic" mirrors or lenses or optically induced lenses each generating predetermined potentials in which the beam is subjected to collimated or deflecting forces. Furthermore, a target 180 can be arranged in the output channel 160 in dependence on particular applications (see below).

The function of a matter wave manipulator is described in the following with reference to FIG. 7. The matter wave manipulator 300 comprising a magnetic manipulator trap 310 and a switching device 320 is combined with the output channel 160 of an atom laser 100 according to FIG. 3. The output channel 160 is extending along the glass cell 131 which is partially shown in FIG. 7. The magnetic manipulator trap 310 is formed by a plurality of coils 311, 312 (current supply not shown) being adapted to form a predetermined deflection potential in dependence on the function of the manipulator. In the illustrated example, two cylindrical coils are operated to form a symmetric reflection potential 313. In alternative embodiments, the coil configuration of FIG. 1 or even other coil configurations can be used for forming other potentials.

The switching device 320 preferably comprises a laser source 321 with a focussing device 322. The laser source 321 is formed e.g. by a diode laser emitting at a wavelength according to the atomic transition to be induced. The diode laser is stabilized by current stabilization and or a phase-lock stabilization technique. As an example, the diode laser emits at 795 nm for switching rubidium atoms from the magnetically trapped or magnetic |F=2, $m_F$=1) state to the untrapped or non-magnetic |F=1, $m_F$=0) state or vice versa. Alternatively, a rf emitter according to the above outcoupling device 150 is used with the emitting coil being arranged in the output channel 160 above of the magnetic manipulator trap 310.

At least the trap portion 310 of the matter wave manipulator 300 is protected by a shielding device against external magnetic fields. This shielding device comprises an active shielding or preferably an enclosure box from a shielding material described above. The box 200 covers partially the glass cell 131 and the coils 311, 312. According. to alternative embodiments of the invention, the box 200 covers also the remaining parts of the glass cell 131 as illustrated with the broken lines or it is connected with the box 200 of the atom laser 100 (see FIG. 1).

The matter wave manipulator 300 is operated according to the following principles. The matter wave 400 travels under the influence of gravity along the output channel 160. The atoms are in the untrapped state, in which they left the atom laser 100 and in which they practically ($1^{st}$ order) do not feel the magnetic potential of any trap. With the switching device 320, a transition to a magnetic state is induced in the passing matter wave. After the passage at the switching device 320, the atoms are in a state with $m_F$=1 wherein they interact with a magnetic potential. At the magnetic potential 313, the matter wave 400 is reflected (see arrows) and the travelling direction is reversed. After the reflection, the matter wave is switched into the non-magnetic state again when it passes the switching device 320. In this configuration, the matter wave manipulator 300 forms a mirror for atom waves.

The shielding against external magnetic fields represents an essential aspect of the invention also with regard to the matter wave manipulator. As outlined above, the resonance condition of the atom-potential-interaction depends on the precision and stability of the magnetic potential and the difference frequency between the laser or the rf frequency. If the potential is unstable, a broadening of the energy distribution of the atoms would be caused so that the reflected matter wave is decollimated. As described above, also all the atoms which are deflected experience the same gravitational potential resulting in a monoenergetic reflection. The effective surface quality of the matter wave mirror is determined by the resonance condition $1/2\ \mu_B B + \Delta\nu_{HF} = h\nu$ ($\Delta\nu_{HF}$: frequency difference between hyperfine states F=1 and F=2, e.g. 6.86 Hz for rubidium, $\nu$: difference frequency of the laser beams, $\mu_B$: Bohr magneton). This surface quality can be extremely improved compared with the surface quality of metallic mirrors for optical laser radiation.

If the potential 313 would be modified to have an asymmetric shape with respect to the axis of the glass cell, a reflection toward other directions or a focussed reflection could be obtained. Generally, the UHV evacuated glass cell can have another shape being adapted to the travelling direction of the matter wave. Furthermore, if two manipulators according to FIG. 7 are combined with an orientation opposite to each other, a continuously reflected matter wave can be created. As a further modification, it is possible to extend the output channel 160 below the trap 320 toward a target or a measurement system.

The generator operation for creating matter waves according to the invention has the following advantages. The two step trapping with two magneto-optical traps allows the provision of a pre-cooling in a relatively bad vacuum and the BEC formation in a ultra-high vacuum. Within the scope of the invention, this two-step trapping can be extended to a multi-step trapping wherein a chain of a plurality of quadrupole traps is provided before the atoms are transferred into the QUIC trap. This technique would allow the supply of greater atom numbers for creating longer matter waves. Furthermore, the shielding of the QUIC trap could be improved.

The high stability of the magnetic field allows the precise control of the trapping potential which is a pre-requisite for many conceivable applications with BEC's. The spatial separation of the magneto-optical trap and the final magnetic trap does not only simplify the coil geometry but also makes it possible to optimize both traps independently. As an example, much larger trapping beams could be used to collect orders of magnitude more atoms in the magneto-optical trap than at the above example, without sacrificing the tight confinement of the magnetic trap.

The extracted matter wave has an extreme brightness. Defining the brightness as the integrated flux of atoms per source size divided by the velocity spreads in each direction, the brightness of the beams created according to the invention is in the range of $10^{24}$ to $10^{28}$ atoms $s^2m^{-5}$. This represents a brightness that is orders of magnitude higher than that of conventional atom sources (about $10^{18}$ atoms $s^2m^{-5}$).

In the following, preferred applications of an atom laser according to the invention are described. Major applications are in the field of atom optics. It is conceivable to produce diffraction-limited atomic beams which could be focussed down to a spot side of much less than 1 nm. Further application are in the field of the construction of atom interferometers. Highly collimated and slow beams of atoms created according to the invention make it possible to run atom interferometers with large enclosed areas and a superior signal-to-noise ratio which are ideally suited for precision measurements. While the atoms leave the trapped state under the influence of gravity, the present matter wave generator provides also means for investigating the constant of gravitation in geophysical investigations.

In the extracted state, the coherent atom beams have an extremely narrow velocity distribution and accordingly a very high atom delocalisation yielding an extreme high collimation. This characteristic can be used with advantages in the field of construction of atom clocks. Conventional atoms clocks providing a time scale on the basis of spectral properties of certain gas atoms have a restrictive precision due to collisions between the atoms. These collisions and corresponding line shifts could be avoided with an atom clock on the basis of an atom wave generator of the invention.

Another field of applications is given in the technique of information transmission. Due to the extremely short wavelength, the atom waves have a better collimation than laser devices. Accordingly, an atom laser according to the invention could provide an effective tool for information transmission, in particular in the space.

What is claimed is:

1. Magnetic trap to form a magnetic trapping potential for gas atoms, said magnetic trap comprising:

a plurality of trap coils being connected with a current supply device and including two quadrupole coils and one Ioffe coil, wherein the trap coils are arranged in such a relative position that a common trap is formed, said common trap having a quadrupole trap shape with one trap minimum if the quadrupole coils are in an operation condition and the Ioffe coil is in a currentless condition or two trap minima or a Ioffe trap shape if all the quadrupole and Ioffe coils are in an operation condition, a shielding device protecting the magnetic trap against external magnetic fields.

2. Magnetic trap according to claim 1, wherein the trap coils are cylindrical coils, said quadrupole coil being arranged along a common quadrupole coil axis with a quadrupole coil space therebetween and said Ioffe coil being arranged with a Ioffe coil axis intersecting the quadrupole coil axis perpendiculary, said Ioffe coil protruding at least partially into said quadrupole coil space.

3. Magnetic trap according to claim 2, wherein said Ioffe coil has a smaller dimension than each of the quadrupole coils.

4. Magnetic trap according to claim 1, wherein said quadrupole and Ioffe coils are connected with said current supply device such that in said operation condition all coils are subjected to the same stabilized current.

5. Magnetic trap according to claim 1, wherein said shielding device comprises a housing made of a magnetic shielding material.

6. Magnetic trap according to claim 5, wherein said housing is made of a material with a relative magnetic permeability higher than 10000.

7. Magnetic trap according to claim 1, wherein said trap coils are mounted on copper tubes being connected with a cooling system.

8. Magnetic trap according to claim 7, wherein said copper tubes have slit portions for avoiding eddy currents in the operation condition of the trap coils.

9. Magnetic trap according to claim 7, wherein shielding plates are arranged between said trap coils and said copper tubes for avoiding eddy currents in the operation condition of the trap coils.

10. Matter wave generator, comprising:

an atom laser device for the creation of coherent matter waves by extracting atoms from a magnetic trap, and a magnetic field shielding device surrounding the magnetic trap.

11. Matter wave generator according to claim 10, wherein said atom laser device further comprises:

a first magneto-optical trap to form a quadrupole trap for trapping and pre-cooling gas atoms, a second magneto-optical trap connected with the first magneto-optical trap to receive atoms from the first magneto-optical trap and to convert the atoms into a Bose-Einstein condensate, and an outcoupling and cooling device for extracting atoms from the Bose-Einstein condensate into an output channel.

12. Matter wave generator according to claim 11, wherein said second magneto-optical trap comprises a plurality of trap coils being connected with a current supply device and including two quadrupole coils and one Ioffe coil, wherein the trap coils are arranged in such a relative position that a common trap is formed, said common trap having a quadrupole trap shape with one trap minimum if the quadrupole coils are in an operation condition and the Ioffe coil is in a currentless condition or two trap minima or a Ioffe trap shape if all the quadrupole and Ioffe coils are in an operation condition.

13. Matter wave generator according to claim 10, wherein said magnetic field shielding device comprises a housing made of a magnetic shielding material.

14. Matter wave generator according to claim 11, wherein said cooling and outcoupling device coil comprises a cooling and outcoupling coil constructed to subject the atoms in the second magneto-optical trap to an evaporation cooling as well as to extract atoms from the second magneto-optical trap.

15. Matter wave manipulator, comprising:

a first magnetic manipulator trap to form a deflection potential for atom waves traveling under the influence of gravity, a first switching device to induce transitions in said atom wave from an non-magnetic to a magnetic state or vice versa, and a magnetic field shielding device surrounding at least said the first magnetic manipulator trap.

16. Matter wave manipulator according to claim 15, wherein said first magnetic manipulator trap comprises a plurality of trap coils being connected with a current supply device and including two quadrupole coils and one Ioffe coil, wherein the trap coils are arranged in such a relative position that a common trap is formed, said common trap having a quadrupole trap shape with one trap minimum if the quadrupole coils are in an operation condition and the Ioffe coil is in a currentless condition or two trap minima or a Ioffe trap shape if all the quadrupole and Ioffe coils are in an operation condition.

17. Matter wave manipulator according to claim 15, wherein said shielding device comprises a housing made of a magnetic shielding material.

18. Matter wave manipulator according to claim 15, wherein said first switching device comprises a laser device or a rf emitter.

19. Matter wave manipulator according to claim 15, further comprising a second magnetic manipulator trap to form a deflection potential for said atom waves and a second switching device to induce transitions in said atom wave from an non-magnetic to a magnetic state or vice versa, said first and second magnetic manipulator traps with said first and second switching devices being arranged opposite to each other.

20. Matter wave manipulator according to claim 15, further comprising:

an atom laser device for the creation of coherent matter waves by extracting atoms from a magnetic trap, and a magnetic field shielding device surrounding the magnetic trap.

21. Method of generating a coherent matter wave, comprising the steps of:

trapping and pre-cooling atoms in a first magneto-optical trap, transferring the atoms into a second magneto-optical trap, converting said second magneto-optical trap with a quadrupole configuration into magnetic trap with a Ioffe configuration, creating a Bose-Einstein condensate in said magnetic trap and extracting the Bose-Einstein condensate as the coherent matter wave from said magnetic trap.

22. Method according to claim 21, wherein said step of extracting the Bose-Einstein condensate from said magnetic trap comprises radiating a radio-frequency field into the Bose-Einstein condensate with a stepwise decreased or a constant radio-frequency.

23. Method according to claim 21, wherein said Bose-Einstein condensate is created in a magnetic trap comprising:

a plurality of trap coils being connected with a current supply device and including two quadrupole coils and one Ioffe coil, wherein the trap coils are arranged in such a relative position that a common trap is formed, said common trap having a quadrupole trap shape with one trap minimum if the quadrupole coils are in an operation condition and the Ioffe coil is in a currentless condition or two trap minima or a Ioffe trap shape if all the quadrupole and Ioffe coils are in an operation condition.

24. Method according to claim 21, wherein in said second magneto-optical trap or said magnetic trap, respectively, a lower vacuum pressure is created than in said first magneto-optical trap.

25. Method according to claim 21, wherein said second magneto-optical trap or said magnetic trap, respectively, is shielded against external magnetic fields with a housing made of a magnetic shielding material.

26. Method of generating coherent matter waves comprising the steps of:

generating matter waves with an atom laser by extracting atoms using a first magneto-optical trap and a second magneto-optical trap;

shielding said atom laser against external magnetic fields by surrounding a said second magneto-optical trap with a magnetic field shielding device.

27. Method of manipulating coherent matter waves comprising the steps of:

manipulating matter waves with a matter wave manipulator by deflecting atoms with at least one a magnetic trap shielding said matter wave manipulator against external magnetic fields by surrounding said magnetic trap with a magnetic field shielding device.

* * * * *